United States Patent [19]

Okimoto et al.

[11] Patent Number: 4,875,454

[45] Date of Patent: Oct. 24, 1989

[54] SUPERCHARGING APPARATUS FOR AN INTERNAL COMBUSTION ENGINE

[75] Inventors: Haruo Okimoto; Seiji Tashima, both of Hiroshima, Japan

[73] Assignee: Mazda Motor Corporation, Hiroshima, Japan

[21] Appl. No.: 143,627

[22] Filed: Jan. 13, 1988

[30] Foreign Application Priority Data

Feb. 17, 1987 [JP] Japan ................................. 62-33913

[51] Int. Cl.[4] ............................................. F02B 33/38
[52] U.S. Cl. .................................. 123/559.3; 123/561
[58] Field of Search ................ 74/866, 870; 123/559.3, 123/561

[56] References Cited

U.S. PATENT DOCUMENTS

| 2,080,079 | 5/1937  | Johnson ........................... 123/561 X |
| 2,354,047 | 7/1944  | Owner ................................. 123/561 |
| 2,894,498 | 7/1959  | Chaplin et al. ....................... 123/561 |
| 3,712,280 | 1/1973  | Brille et al. . |
| 3,795,231 | 3/1974  | Brille . |
| 4,470,394 | 9/1984  | Tadokoro et al. ................... 123/432 |
| 4,484,556 | 11/1984 | Okimoto et al. ..................... 123/432 |
| 4,527,534 | 7/1985  | Sakurai et al. ..................... 123/559.1 |
| 4,554,890 | 11/1985 | Okimoto et al. ....................... 123/26 |
| 4,589,396 | 5/1986  | Tokushima et al. ............. 123/559.3 |
| 4,669,335 | 6/1987  | Matsuoka et al. ..................... 74/866 |
| 4,669,441 | 6/1987  | Okimoto ............................. 123/559 |

FOREIGN PATENT DOCUMENTS

| 2149430 | 4/1973 | Fed. Rep. of Germany ...... 123/561 |
| 626072  | 7/1949 | United Kingdom ................ 123/561 |

Primary Examiner—Michael Koczo
Attorney, Agent, or Firm—Fleit, Jacobson, Cohn, Price, Holman & Stern

[57] ABSTRACT

A supercharging apparatus for an internal combustion engine wherein a supercharger is disposed in the intake passage of the engine. A stepwise variable transmission drives the supercharger. The transmission has a plurality of gear stages so that the rotational characteristics of supercharger can be changed. The stepwise variable transmission has a one-way clutch that interrupts the driving relation between a lower gear stage and the engine output shaft during shift-up operation. Therefore, rapid shift-up operation and shockless shift-down operation are obtained.

8 Claims, 9 Drawing Sheets

SUPERCHARGING APPARATUS FOR AN INTERNAL COMBUSTION ENGINE

FIELD OF THE INVENTION

The present invention relates to a supercharger for an internal combustion engine, the rotational characteristics of which are changeable and, more particularly, to a compact or simplified supercharger having a stepwise variable transmission by which an amount of charged air is controlled.

BACKGROUND OF THE INVENTION

For the purpose of driving a supercharger, use of a continuously variable transmission is known. Japanese Laid-Open Utility Model No. 61-32525 shows a supercharging system in which a supercharger is driven mechanically by an output shaft of an engine through a continuously variable transmission wherein the gear ratio of the continuously variable transmission is controlled precisely to obtain an optimum rotational speed of supercharger in accordance with engine operating conditions. Use of a continuously variable transmission, however, requires variable pulleys and accompanying complex mechanisms too large to install in a narrow engine space or, room. The diameters of the pulleys are normally designed to be relatively large in order to change gear ratio effectively over a wide range. Furthermore, actuators required for driving the pulleys are disposed beside the pulleys.

SUMMARY OF THE INVENTION

Accordingly, it is an object of the present invention to provide a compact, simplified supercharger using a novel stepwise variable transmission.

It is another object of the present invention to provide a shockless supercharger without losing response in an acceleration condition.

It is a further object of the present invention to provide a shockless supercharger by utilization of a stepwise variable transmission provided with a one-way clutch.

The above objects are achieved by the present invention by providing a supercharger having a stepwise variable transmission with a one-way clutch, wherein the one-way clutch functions to interrupt the driving relationship between an input shaft for the low gear stage of the supercharger and an output shaft of the engine when the input shaft for the high gear stage of the supercharger is connected with the output shaft of engine via a clutch.

Accordingly, shift-up operation from the low gear stage to the high gear stage is accomplished easily and immediately only by actuating the clutch, as mentioned above. In this shift-up operation, the one-way clutch is being driven and rotates freely; therefore, shift shock does not occur.

On the other hand, the shift-down operation from the high gear stage to the low gear stage is accomplished in such a manner that the driving relationship between the input shaft for the high gear stage and the output shaft of the engine is interrupted by disengaging the clutch from the input shaft for the high gear stage. Thereafter, supercharger rotation gradually decreases until the one-way clutch couples and begins to drive the input shaft for the low gear stage.

Usually, a one-way clutch causes shock at the change point from the driven state to the driving state, but during the shift-down operation of the present invention, the speed of the supercharger is reduced to a low enough point to suppress shift shock.

Other objects and advantages of the present invention will become readily apparent from the following detailed description of the invention when taken with the appended drawings.

DETAILED DESCRIPTION OF PREFERRED EMBODIMENTS

Figure 1:
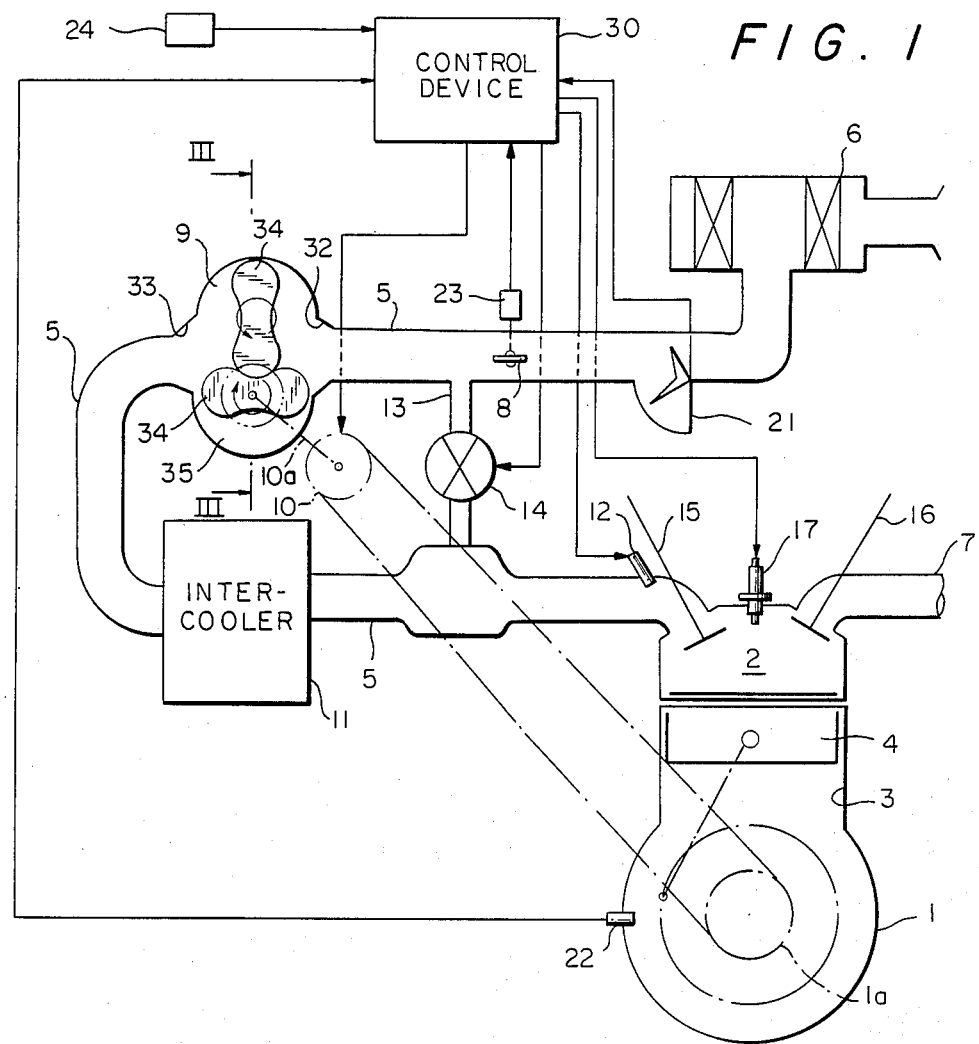
FIG. 1 is a schematic view of the present invention.

Referring now to FIG. 1, the first preferred embodiment of the present invention is illustrated on an engine having supercharger. An engine 1 has a combustion chamber 2 which is defined by a cylinder 3 with a piston 4 accommodated therein. An intake passage 5 connects the combustion chamber 2 to an air chamber 6 in communication with atmosphere, for introducing air to the engine. An exhaust passage 7 is also provided for emitting exhaust gases from the combustion chamber 2. A throttle valve 8 is provided in the intake passage 5 for controlling the amount of intake air. A supercharger 9 is disposed downstream of the throttle valve 8 in the intake passage 5. The supercharger 9 is driven through a stepwise variable transmission 10, for example, a two-gear stage type. The supercharger 9 is driven from an output shaft 1a of the engine 1 via belt 47, driving transmission 10 and a mechanical connection 10a between transmission 10 and supercharger 9. An intercooler 11 is disposed downstream of supercharger 9 in the intake passage 5 for cooling heated air from the supercharger 9. A fuel injector 12 is provided in the intake passage 5 near the combustion chamber 2 and downstream of the intercooler 11 for supplying fuel to the engine 1. Bypass passage 13 is provided across the intake passage 5 from a point downstream of throttle valve 8 to a point downstream of intercooler 11 for bypassing the supercharger 9 and the intercooler 11. A bypass valve 14 is provided in the bypass passage 13. Reference numeral 15 denotes an intake valve; reference numeral 16 denotes an exhaust valve.

An airflow sensor 21 is provided upstream of the throttle valve 8 in the intake passage 5 for detecting the amount of intake air. An engine speed sensor 22 detects the rotational speed of the output shaft 1a of the engine 1. A throttle sensor 23 detects engine load according to the amount of opening of the throttle valve 8. A mode switch 24 is provided for the driver to select manually either a power mode or an economy mode. Each signal from the sensors 21–24 is input to a control device 30. The control device 30 controls the stepwise variable transmission 10, the bypass valve 14, the fuel injector 12, and an ignition plug 17. Shift change operation of the stepwise variable transmission 10 is performed based on shift change characteristic maps shown in FIGS. 2(a)–2(d).

When the engine 1 is operated in a high gear region of each map, the stepwise variable transmission 10 is shifted to the high gear stage wherein the input shaft rotational speed equals output shaft rotational speed to increase intake volumetric efficiency. When the engine 1 is operated in the low gear region of each map, the stepwise variable transmission 10 is shifted to the low gear stage wherein the input shaft rotational speed equals twice the output shaft rotational speed to prevent the supercharger 9 from generating a pumping loss caused by excessive mechanical friction or heat generation in the supercharger 9.

Figure 3:
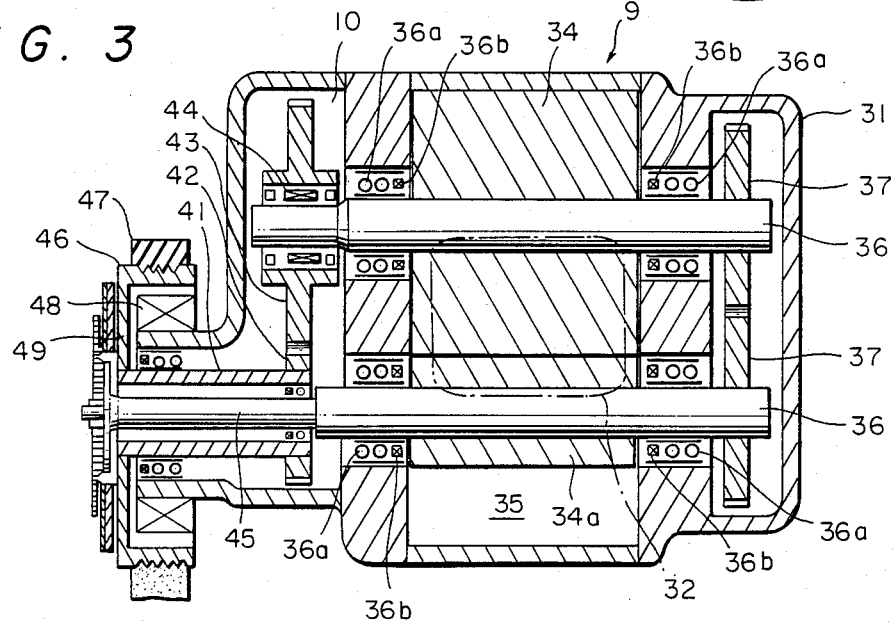
FIG. 3 is a sectional view of the supercharger with a stepwise variable transmission portrayed in FIG. 1 taken along line III—III.

FIG. 3 illustrates the supercharger 9 and the stepwise variable transmission 10 in detail. The inside space of a casing 31 is communicated to both the upstream and the downstream portions of intake passage 5 through inlet 32 and outlet 33 (not shown), respectively. A pair of peanut-shaped or cocoon-shaped rotors 34 are mounted in the casing 31 fixed on shafts 36 to engage and rotate in opposite directions. A working chamber 35 is formed between casing 31 and rotors 34. Intake air introduced from inlet 32 is supercharged and pushed out from outlet 33 according to movement of rotors 34.

Shafts 36 are parallel and supported for rotation by bearings 36a with oil seals 36b provided between casing 31 and shafts 36. A pair of same radius counter gears 37 are fixed to shafts 36 on one side of rotors 34. By these counter gears 37, rotors 34 rotate in opposite directions. Stepwise variable transmission 10 is disposed on the other side of rotors 34. Stepwise variable transmission 10 has a hollow-shaped first input shaft 41 in the form of a sleeve that is bearing supported in casing 31 and on an extension 45 of the lower shaft 36. A pair of reduction gears 42, 43 are provided. The gear 42 has a small diameter and is fixed on a first input shaft 41, and the gear 43 has a larger diameter and is rotatably mounted on an upper shaft 36, to equalize rotational speed of the upper rotor 34 to half the rotational speed of the first input shaft 41. A one-way clutch 44 is mounted between upper shaft 36 and reduction gear 43 and functions in such a manner that upper shaft 36 is locked, clutched, coupled or engaged with first input shaft 41 when the rotational speed of first input shaft 41 is faster than that of upper shaft 36, but the upper shaft 36 is unlocked, declutched, uncoupled or disengaged with first input shaft 41 when the rotational speed of first input shaft 11 is slower than that of upper shaft 36. Shaft extension 45 serves as a second input shaft.

A pulley 46 is connected or fixed to the end of first input shaft 41. Pulley 46 is connected mechanically to engine output shaft 1a by way of belt 47. Inside pulley 46, an electromagnetic coil 48 is fixed on casing 31. Electromagnetic coil 48 is controlled by control device 30. A clutch plate 49 lies adjacent electromagnetic coil 48 and clutch plate 49 is fixed with the end of second input shaft extension 45.

Accordingly, when the electromagnetic coil 48 is energized to establish the high gear stage in the stepwise variable transmission 10, clutch plate 49 couples to pulley 46 due to the electromagnetic force generated by electromagnetic coil 48. Therefore, the driving force of pulley 46 is transmitted to lower shaft 36 through second input shaft extension 45 and via the counter gears 37 to the upper rotor 34. Rotors 34 rotate in opposite directions at the same speed as the speed of pulley 46. Since the rotational speed of upper rotor 34 exceeds that of reduction gear 43, one-way clutch 44 is unlocked, uncoupled or disengaged and the driving relationship between the upper shaft 36 and engine output shaft 1a through one-way clutch 44 is interrupted.

On the other hand, when the electromagnetic coil 48 is not energized to establish the low gear stage in stepwise variable transmission 10, clutch plate 49 is disconnected or decoupled from pulley 46. Therefore, the driving relationship between lower shaft 36 and the engine output shaft 1a through clutch plate 49 is interrupted or decoupled, and the driving force of pulley 46 is transmitted to reduction gears 42, 43 through first input shaft 41. Since the upper rotor 34 is no longer being driven, nor is it able to drive itself, upper rotor 34 starts to slow down; and soon one-way clutch 44 couples, locks or engages itself in such a manner that the driving force of reduction gear 42, 43 is transmitted to upper rotor 34. Rotors 34 rotate via the gears 37 in opposite directions at half the speed of pulley 46.

In this first embodiment, supercharger 9 has high and low rotational characteristics, which fulfill both increase intake efficiency in the low engine speed region and suppress pumping loss in the high engine speed region. Stepwise variable transmission 10 is compact.

Figure 4A:
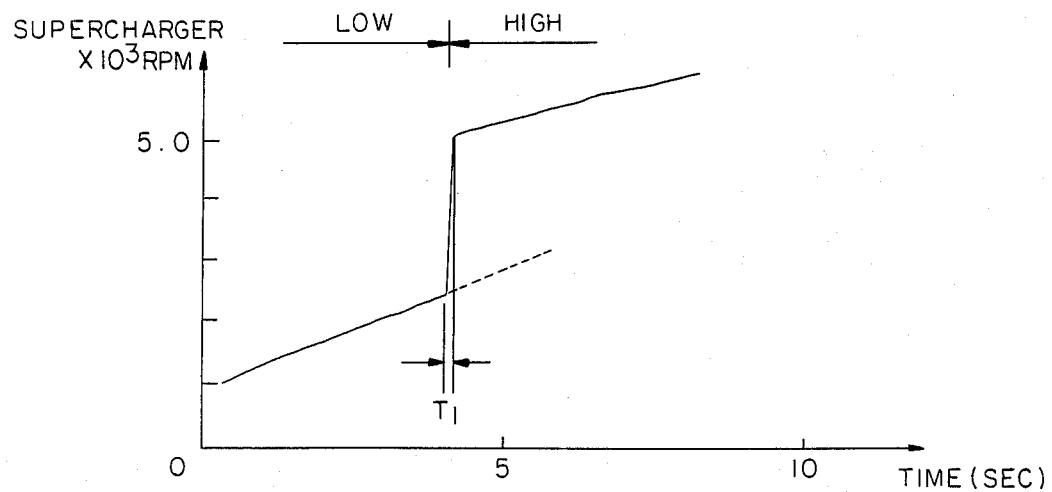
FIGS. 4(a) and 4(b) illustrate speed changes of the supercharger in a shift-up operation and a shift-down operation, respectively.
Figure 4B:
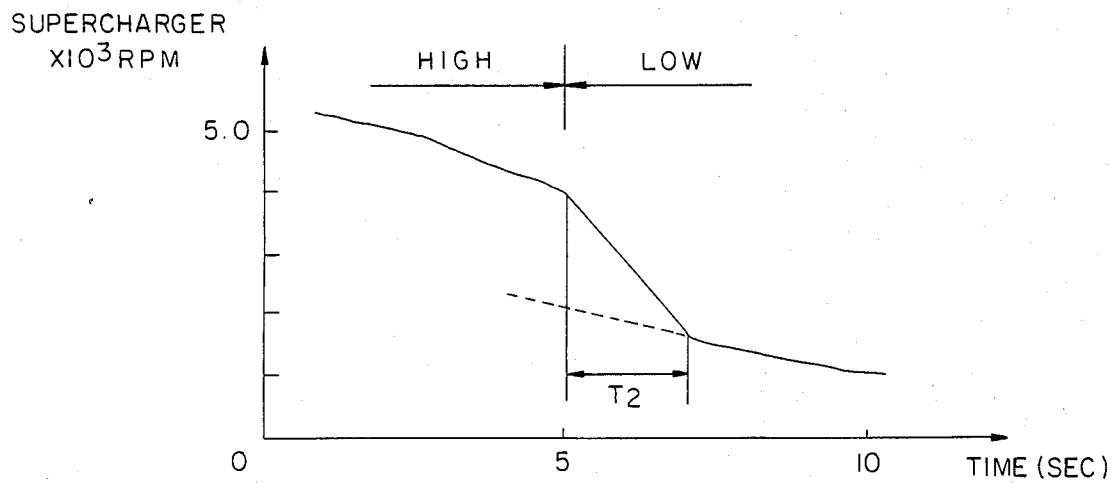

As shown in FIG. 4(a), a graph plotting supercharger speed versus time, shift change from the low gear stage to the high gear stage is accomplished in a relatively short time ($T_1$), a fraction of a second. This rapid change brings good response during acceleration. As shown in FIG. 4(b), a graph plotting supercharger speed versus time, shift change from the high gear stage to the low gear stage is accomplished in a relatively long time, about two seconds, sufficient to eliminate shock. Therefore, rapid shift-up operation and shockless shift-down operation are obtained.

Figure 2A:
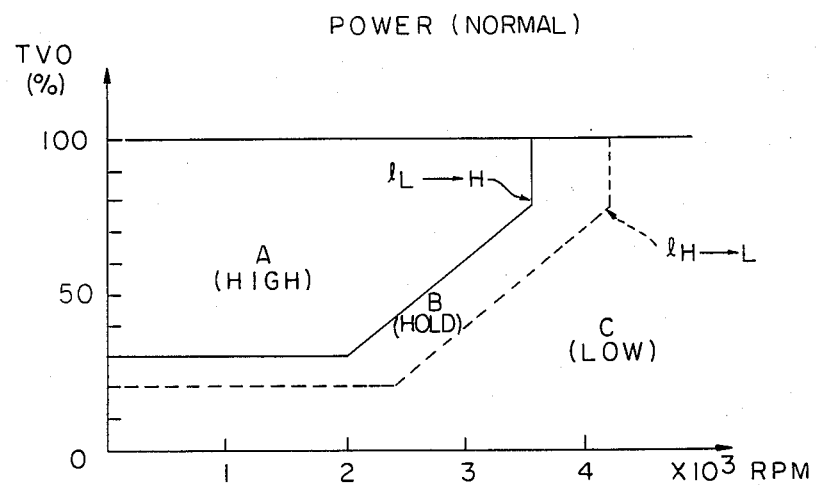
FIGS. 2(a), 2(b), 2(c) and 2(d) are graphs showing shift change characteristics of POWER (NORMAL) MODE, POWER (ACC) MODE, ECONOMY (NORMAL) MODE and ECONOMY (ACC) MODE, respectively.
Figure 2B:
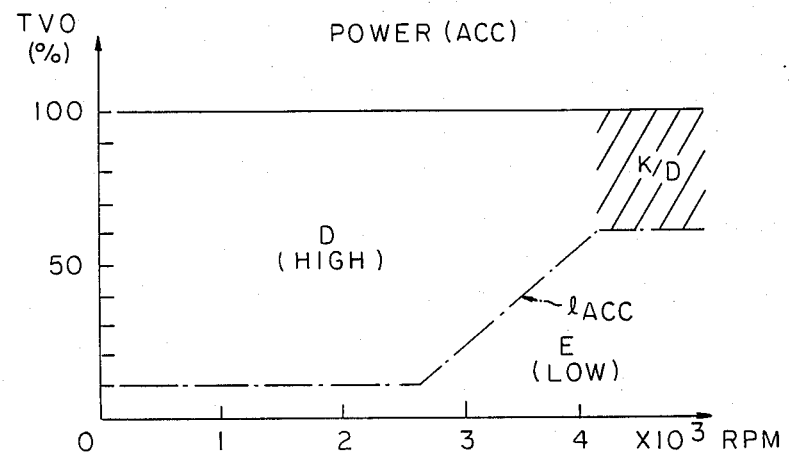
Figure 2C:
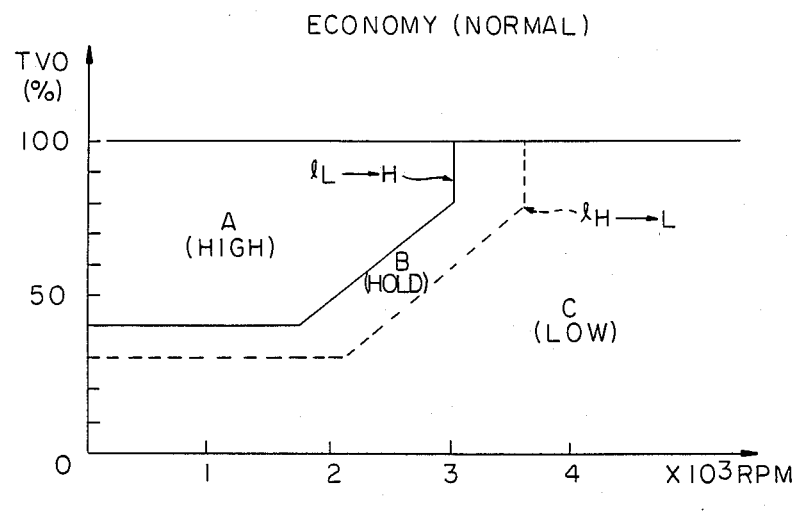
Figure 2D:
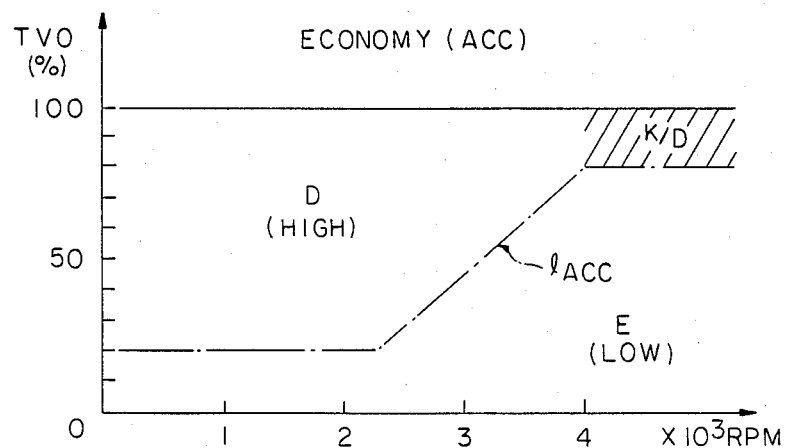

Control device 30 memorizes shift change characteristics as shown in FIGS. 2(a)–2(d). Line $1_{L \to H}$ means shift-up line and line $1_{H \to L}$ means shift-down line. Some hysteresis is provided between the shift-up line and the shift-down line. FIG. 2(a) is a plot of engine speed (rpm) versus throttle valve opening degrees (%) showing POWER (NORMAL) MODE which is designed suitable for powerful driving under normal driving conditions. FIG. 2(b) is a plot of engine speed (rpm) versus throttle valve opening degrees (%) showing POWER (ACC) MODE which is designed suitable for powerful driving under acceleration conditions. In this mode, a kickdown zone (K/D) capable of shifting down under large engine load is provided in the high engine speed region. It is advantageous to accelerate the engine quickly. FIG. 2(c) is a plot of engine speed (rpm) versus throttle valve opening degrees (%) showing ECONOMY (NORMAL) MODE which is designed for economical driving under normal driving conditions, from the viewpoint of fuel consumption. In this mode, high gear region (A) is relatively narrow or smaller in area compared with that of POWER (NORMAL) MODE. FIG. 2(d) is a plot of engine speed (rpm) versus throttle valve opening degrees (%) showing ECONOMY (ACC) MODE which is designed for economical driving under acceleration conditions. In this mode, the kickdown zone (K/D) capable of shifting down under large engine load is also provided in the high engine speed region. In the mode of POWER (ACC) or ECONOMY (ACC), no hysteresis is provided; therefore, the shift line is only the one line $1_{ACC}$.

Figure 5:
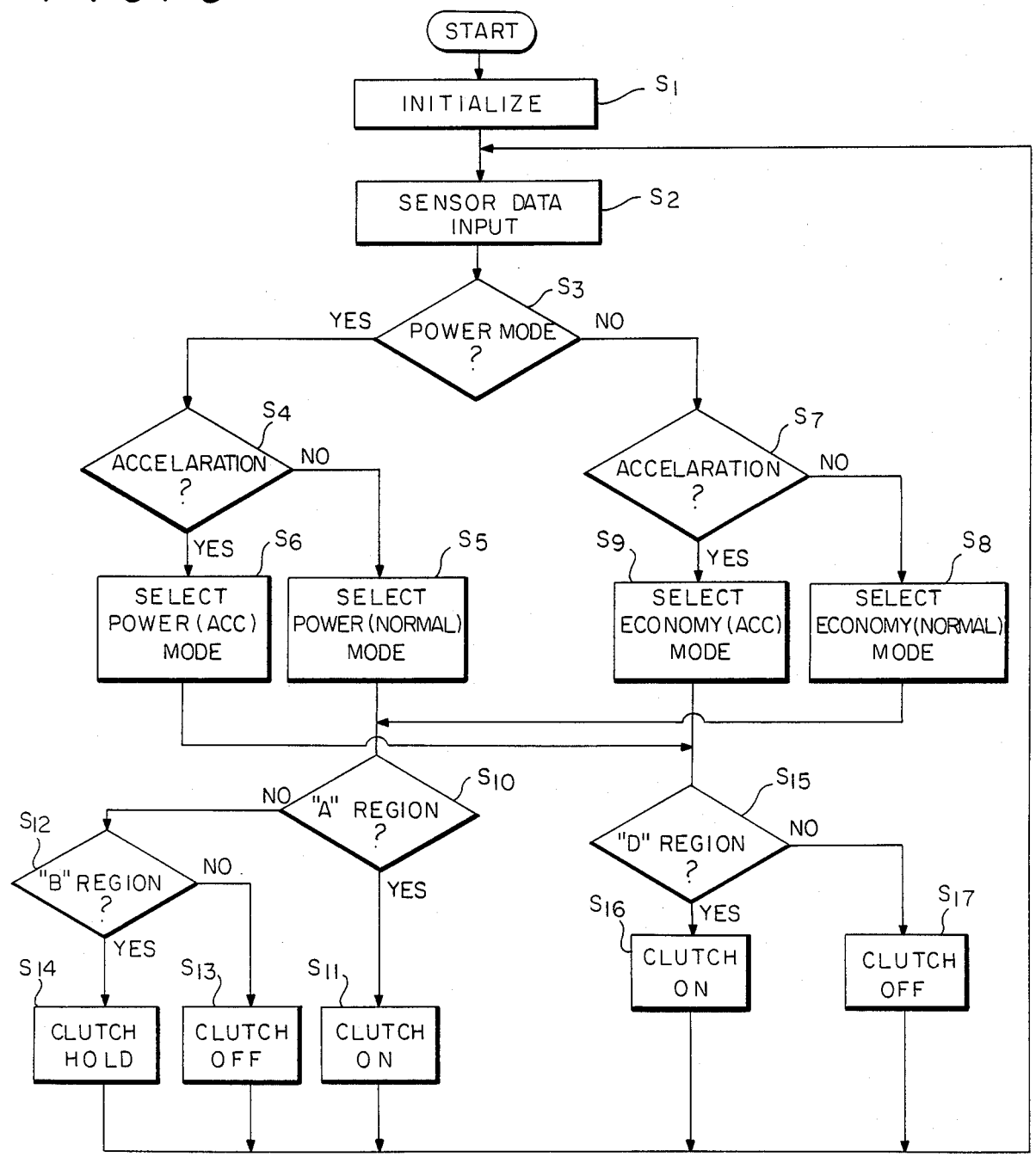
FIG. 5 is a flowchart illustrating the procedure of the controller in the first embodiment of the present invention.

FIG. 5 is a flowchart illustrating the procedure of control device 30. In step $S_1$, all the signal data memorized in control device 30 are cancelled. In step $S_2$, control device 30 reads signals from sensors 21–24. Then, control device 30 determines whether or not POWER MODE is selected in step $S_3$. If the decision or judgment is YES, control device 30 proceeds to step $S_4$. In step $S_4$, control device 30 determines whether or not the engine is accelerating. If the judgment is NO, control device 30 proceeds to step $S_5$ and selects POWER (NORMAL) MODE. If the judgment is YES in step $S_4$, control device 30 proceeds to step $S_6$ and selects POWER (ACC) MODE. Returning to decision step $S_3$, if the judgment is NO, control device 30 proceeds to step $S_7$ and determines whether or not the engine is accelerating. If the judgment of step $S_7$ is NO, control device 30 proceeds to step $S_8$ and selects ECONOMY (NORMAL) MODE. If the judgment of step $S_7$ is YES, control device 30 proceeds to step $S_9$ and selects ECONOMY (ACC) MODE.

After step $S_5$ or step $S_8$, control device 30 proceeds to step $S_{10}$ and determines whether or not the engine is in the "A" region of each shift map. If the judgment is YES, control device 30 proceeds to step $S_{11}$ and energizes electromagnetic coil 48 to engage clutch plate 49 and couple it with pulley 46. If the judgment of step $S_{10}$ is NO, control device 30 proceeds to step $S_{12}$ and determines whether or not the engine is in the "B" region of each shift map. If the judgment of step $S_{12}$ is NO, control device 30 proceeds to step $S_{13}$ and deenergizes electromagnetic coil 48 to disengage or decouple clutch plate 49 from pulley 46. If the judgment of step $S_{12}$ is YES, control device 30 proceeds to step $S_{14}$ and maintains the energized state of electromagnetic coil 48 to hold clutch plate 49 coupled to pulley 46.

After step $S_6$ and step $S_9$, control device 30 proceeds to step $S_{15}$ and determines whether or not the engine is in the "D" region. If the judgment of step $S_{15}$ is YES, control device 30 proceeds to step $S_{16}$ and energizes electromagnetic coil 48 to engage clutch plate 49 and couple it to pulley 46. If the judgment of step $S_{15}$ is NO, control device 30 proceeds to step $S_{17}$ and deenergizes electromagnetic coil 48 to disengage or decouple clutch plate 49 from pulley 46. Control device 30 immediately returns to step $S_2$ after finishing the clutch controls in steps $S_{11}$, $S_{13}$, $S_{14}$, $S_{16}$ and $S_{17}$. In steps $S_4$ and $S_7$, control device 30 judges if the engine is accelerating and when the change speed of the throttle opening degrees exceeds about the full throttle opening angle per second.

Figure 6:
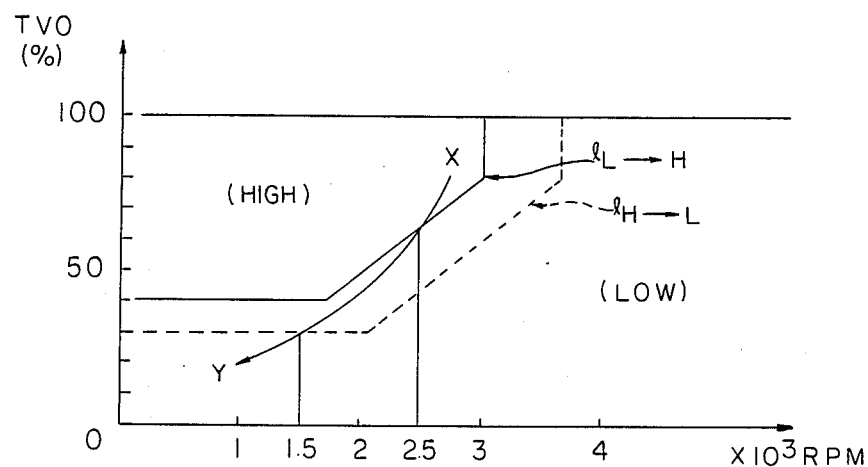
FIG. 6 illustrates one example of the deceleration operation.

FIG. 6 illustrates one example of deceleration. The engine starts decelerating at point "X" and crosses shift-up line $1_{L \rightarrow H}$ at 2500 rpm of engine speed. Then, the engine crosses the shift-down line $1_{H \rightarrow L}$ at 1500 rpm of engine speed and reaches point "Y".

Figure 7:
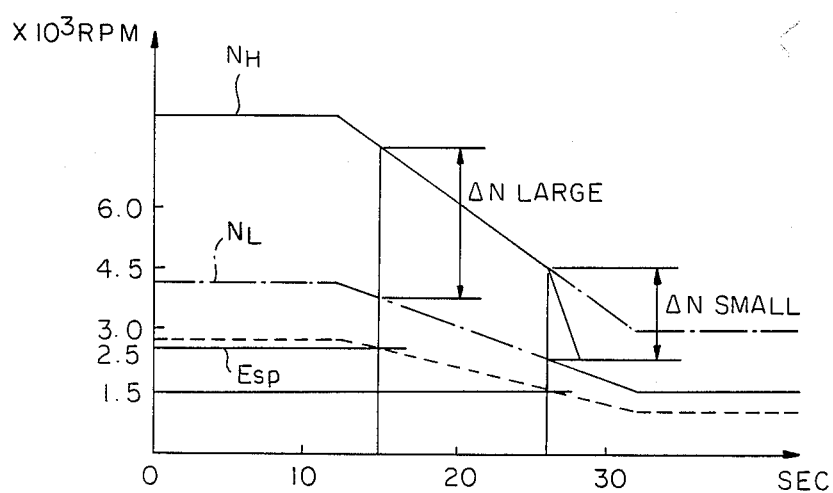
FIG. 7 shows speed changes of the supercharger and engine in the case graphically portrayed in FIG. 6.

FIG. 7 illustrates how the supercharger speed and engine speed change during the deceleration shown in FIG. 6. If there is no hysteresis, shift-down occurs at 2500 rpm of engine speed ($E_{sp}$). At this moment, the speed difference between the high gear speed ($N_H$) and low gear speed ($N_L$) is still large (see $\Delta$ N large in FIG. 7). But, in this embodiment, shift-down occurs at 1500 rpm of engine speed ($E_{sp}$). The speed difference between high gear speed ($N_H$) and low gear speed ($N_L$) becomes relatively small (see $\Delta$ N small in FIG. 7). Though one-way clutch, causes some shock at the change point from the driven state to the driving during shift-down, it is advantageous to reduce shock by a speed difference that is relatively small in this shift-down operation.

The ratio of the rotational speed of pulley 46 and that of the engine output shaft is 3.0; therefore, supercharger speed in the low gear stage is 1.5 times that of the engine speed.

Figures 8, 9:
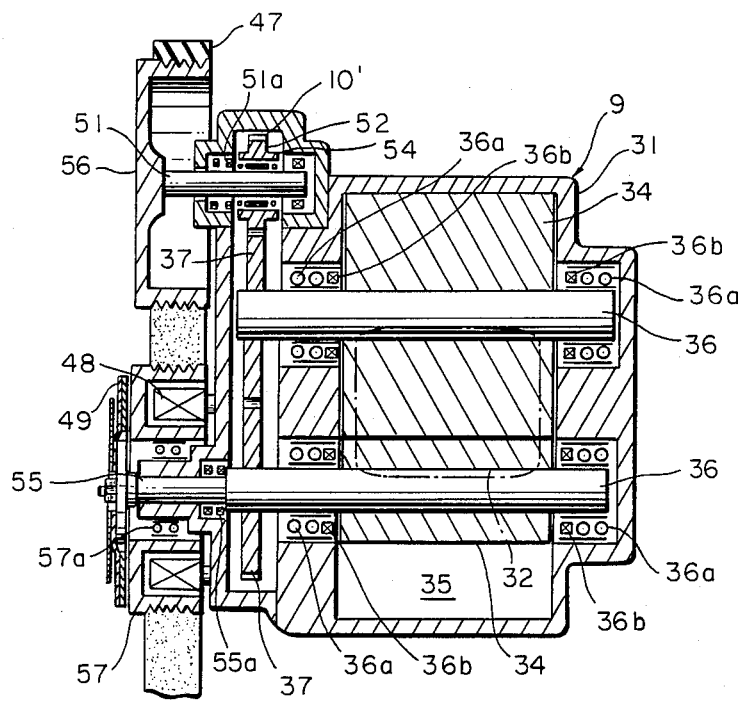
FIG. 8 is a second embodiment of the present invention similar to FIG. 3.
FIG. 9 is a third embodiment of the present invention similar to FIG. 3.

FIG. 8 shows a second embodiment of the present invention. In this embodiment, the stepwise variable transmission 10' is driven by two pulleys. The stepwise variable transmission 10' has an input shaft 51 supported in casing 31 by bearings 51a; a reduction gear 52 is provided between input shaft 51 and upper shaft 36 to equalize the rotational speed of upper rotor 34 to half of the rotational speed of the input shaft 51. A one-way clutch 54 is disposed between input shaft 51 and reduction gear 52 that functions in such manner that upper shaft 36 is locked or engaged with input shaft 51 when the rotational speed of input shaft 51 is faster than that of upper shaft 36; but upper shaft 36 is unlocked, decoupled or disengaged from input shaft 51 when the rotational speed of input shaft 51 is slower than that of gear 52. A second input shaft 55 connects with lower shaft 36 and is mounted in casing 31 by bearing 55a. A low gear pulley 56 is fixed to the end of input shaft 51. A high gear pulley 57 is bearing mounted by bearing 57a around the end of input shaft 55. Pulleys 56, 57 are connected to engine output shaft 1a through belt 47. Like the first embodiment, electromagnetic coil 48 is mounted inside the high gear pulley 57 fixed to casing 31, and clutch plate 49 is fixed to the end of the input shaft 55.

Accordingly, when the electromagnetic coil 48 is energized to establish the high gear stage in stepwise variable transmission 10', clutch plate 49 is coupled to the high gear pulley 57. Therefore, the driving force of the high gear pulley 57 is transmitted to lower shaft 36 through plate 49 and input shaft 55. Rotors 34 rotate in opposite directions at the same speed due to the transmission provided by gears 37. Rotors 34 rotate at the speed of the high gear pulley 57. The driving force of rotors 34 is also transmitted to reduction gear 52 through counter gears 37. Since the rotational speed of reduction gear 52 exceeds that of low gear pulley 56, the one-way clutch 54 is unlocked, decoupled or disengaged and the driving relationship between the upper shaft 36 and the engine output shaft 1a through the one-way clutch 54 is interrupted.

On the other hand, when the electromagnetic coil 48 is not energized to establish the low gear stage in stepwise variable transmission 10, clutch plate 49 is disconnected or decoupled f high gear pulley 57. Therefore, the driving relationship between the input shaft 55 and engine output shaft 1a is interrupted. Since upper rotor 34 is unable to drive itself, one-way clutch 54 soon locks, couples or engages itself so that the driving force of low gear pulley 56 is transmitted to the upper rotor 34 through input shaft 51, reduction gear 52 and counter gears 37. Rotors 34 rotate in opposite directions at half the speed of the low gear pulley 56. In this second embodiment, counter gear 37 for upper rotor 34 functions as both part of the reduction gearing and as the transmission between rotors 34; therefore, the overall device is more compact.

FIG. 9 shows a third embodiment of the present invention. Supercharger 9' is in the form of a centrifugal pump or compressor. Stepwise variable transmission 10" has four shafts 36', 61, 62 and 68. A rotor 34' formed with a plurality of impellers 34" is mounted in housing 34a. Air introduced into inlet 32 is accelerated toward the radial direction of rotor 34' by impellers 34" and pushed out outlet 33. Rotor 34' is supported in housing 34a, joined to casing 31, by shaft 36'. Bearings 36a and oil seals 36b are provided as the mounting between casing 31 and shaft 36'. A stepwise variable transmission 10" is disposed on one side of the supercharger 9'. Stepwise variable transmission 10" has a hollow-shaped sleeve input shaft 61 that is bearing mounted in casing 31 coaxially with lower shaft 36'. An intermediate shaft 62 is bearing mounted in casing 31 parallel to input shaft 61 by bearings 62a. A pair of meshing low gears 63, 64 are fixed on input shaft 61 and bearing mounted on intermediate shaft 62, respectively, so that intermediate shaft 62 rotates up to 1.4 times the speed of shaft 61. A one-way clutch 65 is disposed between intermediate shaft 62 and low gear 64 and functions in a such manner that intermediate shaft 62 is locked, coupled or engaged with input shaft 61 when the rotational speed of input shaft 61 is faster than that of intermediate shaft 62 but intermediate shaft 62 is unlocked, uncoupled or disengaged with input shaft 61 when the rotational speed of input shaft 61 is slower than that of upper shaft 36. A pair of meshing final gears 66, 67 are fixed, respectively, to intermediate shaft 62 and shaft 36' so that shaft 36' rotates as fast as 1.8 times the speed of intermediate shaft 62. An input shaft 68 is bearing mounted inside input sleeve shaft 61 by bearings 68a. A pair of meshing high gears 69, 70 are fixed, respectively, to input shaft 68 and intermediate shaft 62 so that intermediate shaft 62 rotates as fast as 1.7 times the speed of input shaft 68.

Pulley 46, fixed to the end of input shaft 61, is connected to engine output shaft 1a through belt 47. Like the first embodiment, electromagnetic coil 48 is mounted inside pulley 46 fixed to casing 31. Clutch plate 49 is fixed to the end of the input shaft 68.

Accordingly, when the electromagnetic coil 48 is energized to establish the high gear stage in stepwise variable transmission 10", clutch plate 49 is coupled to pulley 46. Therefore, the driving force of pulley 46 is transmitted to intermediate shaft 62 through input shaft 68 and high gears 69, 70. The driving force of intermediate shaft 62 is transmitted to shaft 36' through final gears 66, 67.

Since the rotational speed of intermediate shaft 62 exceeds that of low gear 64, one-way clutch 65 is unlocked, uncoupled or disengaged and the driving relationship between intermediate shaft 62 and engine output shaft 1a through one-way clutch 65 is interrupted.

On the other hand, when the electromagnetic coil 48 is not energized to establish the low gear stage in stepwise variable transmission 10", clutch plate 49 is decoupled or disconnected from pulley 46. Therefore, the driving relationship between input shaft 68 and engine output shaft 1a is interrupted. Since intermediate shaft 62 is unable to drive itself, one-way clutch 65 soon locks, couples or engages itself so that the driving force of pulley 46 is transmitted to shaft 36' through intermediate shaft 62 and final gears 66, 67.

Figure 10:
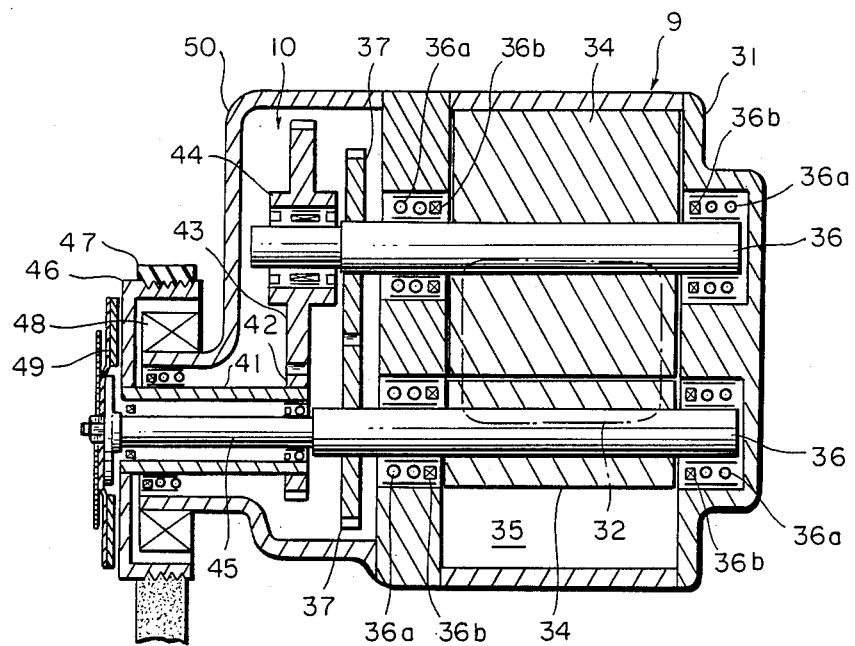
FIG. 10 is a fourth embodiment of the present invention similar to FIG. 3.

FIG. 10 shows a fourth embodiment of the present invention. This embodiment is the same as the first embodiment except for the layout of the counter gears 37. In this fourth embodiment, stepwise variable transmission 10 and counter gears 37 are gathered in the same space. It is advantageous from the viewpoint of common use of a gear case or oil case (lubrication).

Figure 11:
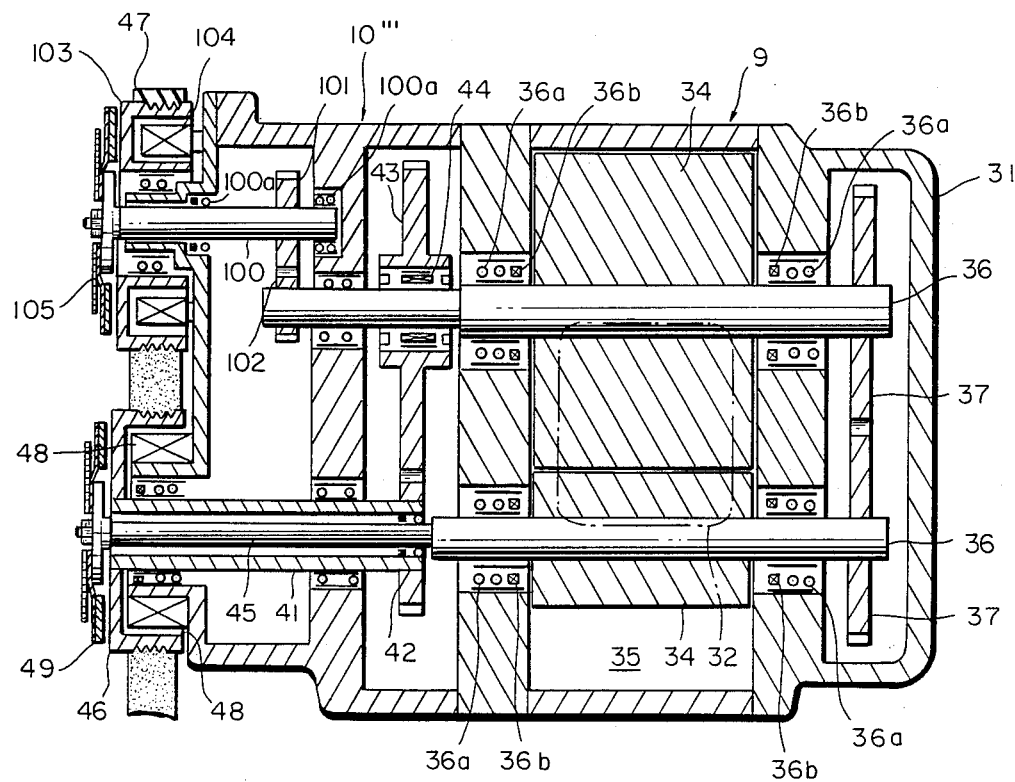
FIG. 11 is a fifth embodiment of the present invention similar to FIG. 3.

FIG. 11 shows a fifth embodiment of the present invention. A stepwise variable transmission 10''' is shown having three gear stages. This stepwise variable transmission 10''' has all the elements of the first embodiment, adding a third input shaft 100 supported in casing 31 by bearings 100a, a pair of meshing overdrive gears 101, 102 mounted fixed to shaft 100 and upper shaft 36, respectively, so that upper shaft 36 rotates as fast as 1.5 times the speed of the third input shaft 100. A pulley 103 driven by belt 47 is bearing mounted on casing 31. An electromagnetic coil 104 is mounted inside pulley 103 and fixed to casing 31. A clutch plate 105 is fixed to the end of third input shaft 100.

Accordingly, this fifth embodiment is able to obtain three gear stages, i.e., low gear stage, high gear stage, and overdrive gear stage. When electromagnetic coil 104 is energized to establish the overdrive gear stage in stepwise variable transmission 10''', clutch plate 105 is coupled or connected to pulley 103. Therefore, the driving force of high gear pulley 103 is transmitted to upper shaft 36 through the third input shaft 100, and rotors 34 rotate in opposite directions at 1.5 times the speed of pulley 103. Electromagnetic coil 48 is deenergized during activation of electromagnetic coil 104, in order to prevent gear lock. Since the rotational speed of upper shaft 36 exceeds that of reduction gear 43, one-way clutch 44 is unlocked, uncoupled, declutched or disengaged.

Figure 12:
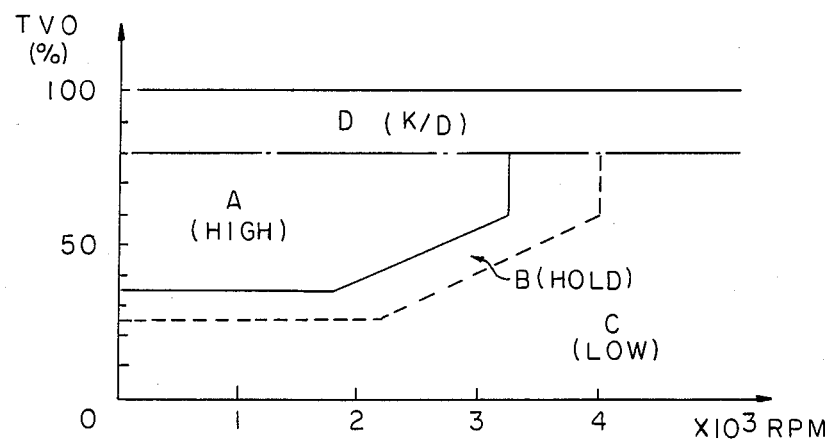
FIG. 12 is a graph depicting shift change characteristics of the fifth embodiment of the present invention and is similar to FIGS. 2(a)–2(d)

FIG. 12 shows shift change characteristics for the apparatus of FIG. 11. Except for the "D" region, this shift map is fundamentally equal to FIGS. 2(a) or FIG. 2(c). The "D" region is designed to be equivalent to above 80% of the throttle valve opening to increase the response in the kickdown operation.

Figure 13:
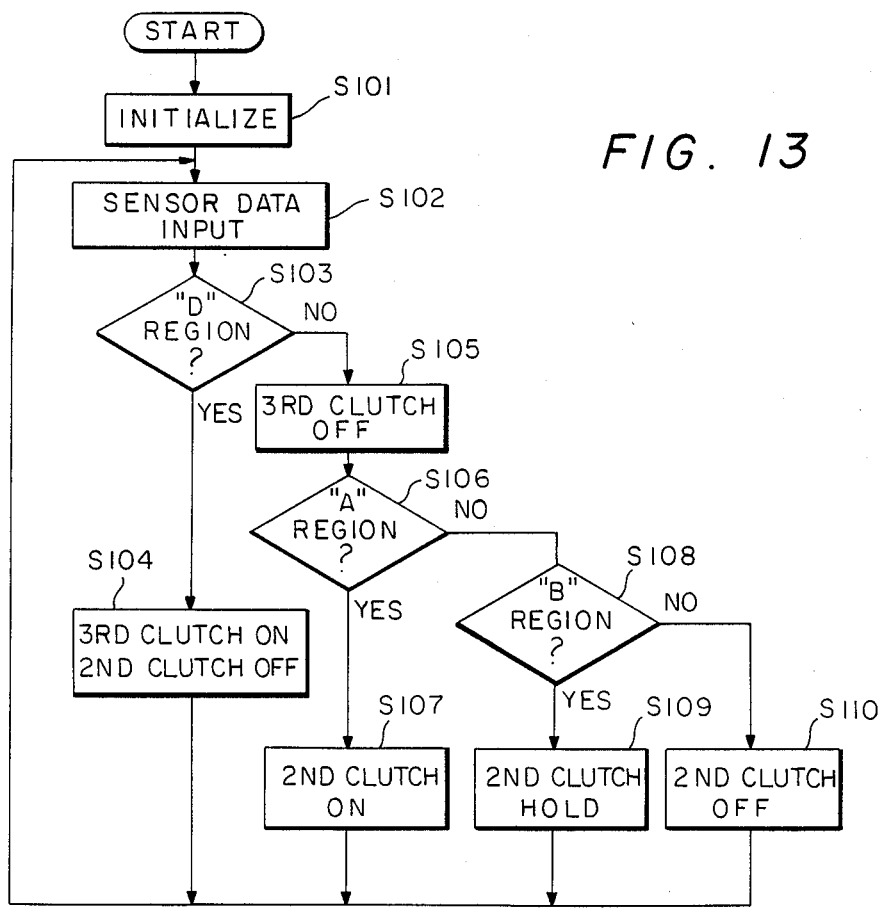
FIG. 13 is a flowchart illustrating the procedure of the controller in the fifth embodiment of the present invention.

FIG. 13 is a flowchart that illustrates the procedure of control device 30. In step $S_{101}$, all the signal data memorized in control device 30 are cancelled. In step $S_{102}$, control device 30 reads signals from sensors 21–24. Then, control device 30 proceeds to step $S_{103}$ and determines whether or not the engine is in the "D" region of the shift map. If the judgment is YES, control device 30 proceeds to step $S_{104}$ and energizes electromagnetic coil 104 and deenergizes electromagnetic coil 48. If the judgment of step $S_{103}$ is NO, control device 30 proceeds to step $S_{105}$ and deenergizes electromagnetic coil 104. Then, control device 30 proceeds to step $S_{106}$ and predetermines whether or not the engine is in the "A" region of the shift map. If the judgment is YES, control device 30 proceeds to step $S_{107}$ and energizes electromagnetic coil 48. If the judgment of step $S_{106}$ is NO, control device 30 proceeds to step $S_{108}$ and determines whether or not the engine is in the "B" region of the shift map. If the judgment is YES, control device 30 proceeds to step $S_{109}$ and maintains the state of electromagnetic coil 48. If the judgment of step $S_{108}$ is NO, control device 30 proceeds to step $S_{110}$ and deenergizes electromagnetic coil 48. Control device 30 immediately returns to step $S_{102}$ after finishing clutch controls in steps $S_{104}$, $S_{107}$, $S_{109}$ and $S_{110}$.

Whereas the present invention has been shown and described in terms of specific preferred embodiments, various changes and modifications, which do not depart from the spirit and scope of the invention, will be obvious to those skilled in the art. Such are deemed to fall within the purview of the teachings of the present invention.

What is claimed is:

1. A supercharging apparatus for an internal combustion engine comprising:
    supercharger means to be disposed in an intake passage means of the engine;
    mechanical transmission means for driving the supercharger from the engine at a speed proportional to the engine speed;
    said mechanical transmission means including a stepwise variable transmission having a plurality of gear stages and one-way clutch means for interrupting the driving relationship between a lower gear stage and an input to the lower gear stage during shift-up operation; and
    control means for shifting the stepwise transmission;
    said control means having a plurality of shift change patterns which determine a suitable gear ratio of the stepwise transmission according to engine driving conditions, each of which is different from one another in the engine driving conditions where the stepwise transmission is shifted from a predetermined gear ratio to another predetermined gear ratio.

2. A supercharging apparatus for an internal combustion engine as defined in claim 1, wherein the control means has a mode selecting means for selecting one of a plurality of shift change patterns.

3. A supercharging apparatus for an internal combustion engine as defined in claim 2, wherein the mode selecting means in a manual switch means for selecting one mode of a plurality of shift change patterns including power mode that is suitable for powerful driving and economy mode that is suitable for economical driving.

4. A supercharging apparatus for an internal combustion engine as defined in claim 1, wherein the control means selects one of different modes under an acceleration condition compared with normal condition.

5. A supercharging apparatus for an internal combustion engine as defined in claim 1, wherein the control means has a shift change pattern that includes hysteresis between shift-up operation and shift-down operation.

6. A supercharging apparatus for an internal combustion engine comprising:
    supercharger means to be disposed in an intake passage means of the engine;
    mechanical transmission means for driving said supercharger means from the engine at a speed proportional to the engine speed;
    control means for changing the gear ratio of said mechanical transmission means;
    said control means having a plurality of gear ratio change patterns which determine a suitable gear ratio of the mechanical transmission means according to engine driving conditions, each of which is different from the other in the engine driving conditions where the mechanical transmission means is shifted from a predetermined gear ratio to another predetermined gear ratio; and
    said control means having a mode selecting means for selecting one of a plurality of said gear ratio change patterns.

7. A supercharging apparatus for an internal combustion engine as in claim 6, wherein the mode selecting means is a manual switch for selecting one of said plurality of gear ratio change patterns including a power mode for powerful driving and an economy mode for economical driving.

8. A supercharging apparatus for an internal combustion engine as in claim 6, wherein said control means selects one of different modes during an acceleration condition compared to normal operation conditions.

* * * * *